(12) United States Patent
Fujita

(10) Patent No.: US 10,387,093 B2
(45) Date of Patent: Aug. 20, 2019

(54) IMAGE FORMING APPARATUS THAT SETS A TIME-OUT VALUE BASED ON AN EXECUTED APPLICATION, INFORMATION PROCESSING METHOD, STORAGE MEDIUM STORING PROGRAM

(71) Applicant: CANON KABUSHIKI KAISHA, Tokyo (JP)

(72) Inventor: Ryosuke Fujita, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/980,933

(22) Filed: May 16, 2018

(65) Prior Publication Data

US 2018/0335994 A1 Nov. 22, 2018

(30) Foreign Application Priority Data

May 19, 2017 (JP) ................................. 2017-099701

(51) Int. Cl.
*G06F 3/12* (2006.01)
*G06F 21/31* (2013.01)
*G06F 21/52* (2013.01)
*G06F 21/60* (2013.01)

(52) U.S. Cl.
CPC ............ *G06F 3/1297* (2013.01); *G06F 3/121* (2013.01); *G06F 3/1222* (2013.01); *G06F 3/1229* (2013.01); *G06F 3/1238* (2013.01); *G06F 3/1286* (2013.01); *G06F 21/31* (2013.01); *G06F 21/52* (2013.01); *G06F 21/608* (2013.01); *G06F 2221/2137* (2013.01); *G06F 2221/2139* (2013.01)

(58) Field of Classification Search
None
See application file for complete search history.

(56) References Cited

U.S. PATENT DOCUMENTS

| | | | | |
|---|---|---|---|---|
| 5,075,874 A * | 12/1991 | Steeves | ............... | G06F 3/1209 358/1.13 |
| 6,779,028 B1 * | 8/2004 | Nakamura | .......... | H04L 41/0803 709/205 |
| 7,911,948 B2 * | 3/2011 | Sebastian | ............... | H04L 47/10 370/230.1 |
| 2006/0095543 A1 * | 5/2006 | Ito | ..................... | G06F 17/20017 709/218 |
| 2012/0013931 A1 * | 1/2012 | Tsujimoto | .......... | H04N 1/00204 358/1.13 |
| 2014/0019543 A1 * | 1/2014 | Hyun | ................... | H04L 67/104 709/204 |

(Continued)

FOREIGN PATENT DOCUMENTS

JP 2011095869 A 5/2011

*Primary Examiner* — Miya J Williams
(74) *Attorney, Agent, or Firm* — Rossi, Kimms & McDowell LLP

(57) ABSTRACT

There is provided an image forming apparatus which comprises: a memory for storing an application, and a platform being a program environment for executing the application; a setting unit for setting a time-out value related to execution time of the application operating on the platform stored in the memory; and a controlling unit for controlling execution of the application based on the time-out value, set by the setting unit, related to the execution time of the application.

10 Claims, 9 Drawing Sheets

(56) References Cited

U.S. PATENT DOCUMENTS

| | | | | |
|---|---|---|---|---|
| 2014/0137232 A1* | 5/2014 | Kobayashi | ............ | H04L 63/083 |
| | | | | 726/17 |
| 2015/0023161 A1* | 1/2015 | Alisawi | ................ | H04W 76/10 |
| | | | | 370/230 |
| 2015/0074167 A1* | 3/2015 | Sonoda | ................... | G06F 9/445 |
| | | | | 709/201 |
| 2015/0156057 A1* | 6/2015 | Leung | ....................... | G06F 8/41 |
| | | | | 709/223 |

* cited by examiner

FIG. 4

```
    {
401 — "appId"    : "1",
402 — "name"     : "appName",
403 — "version"  : "0001",
404 — "control"  : [ "login" ],
405 — "timeout"  : "10000"
    }
``` though the application is operating normally. Here, since it is necessary to update the platform for changing the time-out value, it is not possible to easily change the time-out value.
IMAGE FORMING APPARATUS THAT SETS A TIME-OUT VALUE BASED ON AN EXECUTED APPLICATION, INFORMATION PROCESSING METHOD, STORAGE MEDIUM STORING PROGRAM

BACKGROUND OF THE INVENTION

Field of the Invention

The present invention relates to an image forming apparatus, an information processing method which is applied to the image forming apparatus, and a storage medium which stores a program for achieving the information processing method.

Description of the Related Art

A system capable of extending the functions of an image forming apparatus by installing an extended application (hereinafter referred to as an application) on an application platform (hereinafter referred to as a platform) of the image forming apparatus has become widespread. In the system like this, if there is no response for a certain period of time after inputting a request from the platform to the application, it is determined that an abnormality occurs in the application. Hereinafter, such a function is called a time-out process. A threshold of time for determining that the abnormality occurs in the time-out process is called a time-out value, and the time-out value is defined in the platform.

Since the time-out value is defined as a fixed value in the platform, the certain time-out value is used regardless of the application. The time-out value is determined at the time of platform development. For this reason, in a case where an application which includes a process taking longer time than the assumption at the time of platform development is installed, there is a case where it is erroneously determined that an abnormality occurs although the application is operating normally. Here, since it is necessary to update the platform for changing the time-out value, it is not possible to easily change the time-out value.

Japanese Patent Application Laid-Open No. 2011-95869 discloses a technique of managing statistical information such as a time-out occurrence rate of an application and the like, and dynamically changing a time-out value by analyzing the statistical information.

SUMMARY OF THE INVENTION

One aspect of an image forming apparatus of the present invention is characterized by comprising a setting unit for setting a time-out value related to execution time of an application, and a controlling unit for controlling execution of the application based on the time-out value of the application set by the setting unit.

Further features of the present invention will become apparent from the following description of exemplary embodiments with reference to the attached drawings.

BRIEF DESCRIPTION OF THE DRAWINGS

FIG. 4 is a diagram for illustrating an example of meta-information of an application.

DESCRIPTION OF THE EMBODIMENTS

Hereinafter, preferred embodiments of the present invention will now be described in detail in accordance with the accompanying drawings.

First Embodiment

Figure 1:
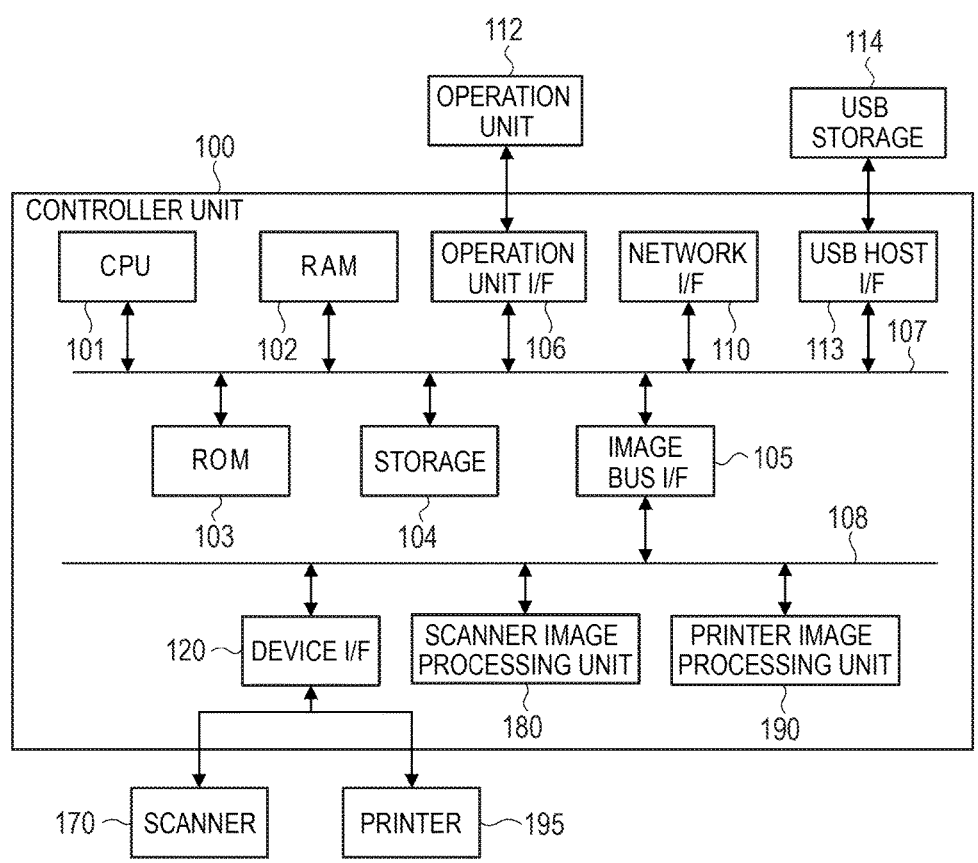
FIG. 1 is a diagram for illustrating an example of a hardware constitution of an image forming apparatus.

FIG. 1 is a diagram for illustrating an example of a hardware constitution of an image forming apparatus. The image forming apparatus includes a controller unit 100. To the controller unit 100, a scanner 170 serving as an image inputting device, and a printer 195 serving as an image outputting device are connected. Also, an operation unit 112 is connected to the image forming apparatus. The controller unit 100 executes control for achieving a copy function of print-outputting image data read by the scanner 170 with use of the printer 195.

The controller unit 100 comprises a CPU (central processing unit) 101. The CPU 101 executes a process based on a boot program stored in a ROM (read only memory) 103, thereby activating and executing a program of an OS (operation system) to achieve the function of the OS. On the relevant OS, the CPU 101 executes a process based on an application program stored in a storage 104, thereby achieving the function of the application. Various processes are executed by the applications. A RAM (random access memory) 102 is used as a working area of the CPU 101. In the RAM 102, the working area is provided, and also an image memory area for temporarily storing image data is provided. The storage 104 stores the application program and the image data.

The ROM 103, the RAM 102, an operation unit I/F (interface) 106, a network I/F 110, a USB (universal serial bus) host I/F 113, and an image bus I/F 105 are connected to the CPU 101 via a system bus 107. The operation unit I/F 106 is an interface with the operation unit 112 having a touch panel. The operation unit I/F 106 outputs the image data to be displayed on the operation unit 112 to the operation unit 112 under the control of the CPU 101. Further, the operation unit I/F 106 sends information input by a user in the operation unit 112 to the CPU 101. The network I/F 110 is an interface for connecting the image forming apparatus to the LAN.

The USB host I/F 113 is an interface unit which communicates with a USB storage 114. The USB host I/F 113 is an outputting unit for causing the USB storage 114 to store the data stored in the storage 104. Besides, the USB host I/F 113 inputs the data stored in the USB storage 114, and notifies the CPU 101 of the input data. The USB storage 114 is an external storage device which stores data, and can be attached to and detached from the USB host I/F 113. A plurality of USB devices including the USB storage 114 can be connected to the USB host I/F 113.

The image bus I/F 105 is a bus bridge which connects the system bus 107 and an image bus 108 for transferring image data at a high speed, and converts a data format. The image bus 108 is composed of a PCI (Peripheral Component Interconnect) bus, an IEEE (Institute of Electrical and Electronics Engineers) 1394 bus, or the like. A device I/F 120, a scanner image processing unit 180 and a printer image processing unit 190 are provided on the image bus 108. The scanner 170 and the printer 195 are connected to the device I/F 120, and the device I/F 120 executes synchronous/asynchronous conversion of the image data. The scanner image processing unit 180 corrects, processes and edits the input image data. The printer image processing unit 190 executes correction, resolution conversion and the like to print output image data according to the printer 195.

Figure 6:
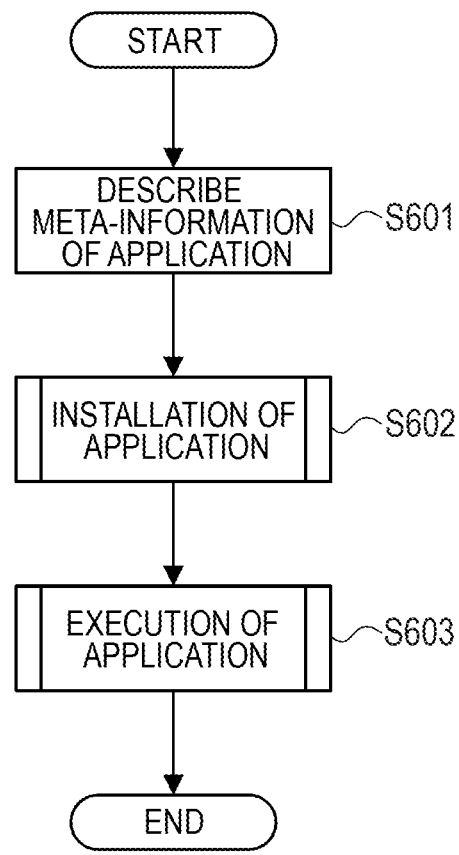
FIG. 6 is a flow chart for describing an example of an information process.
Figure 7:
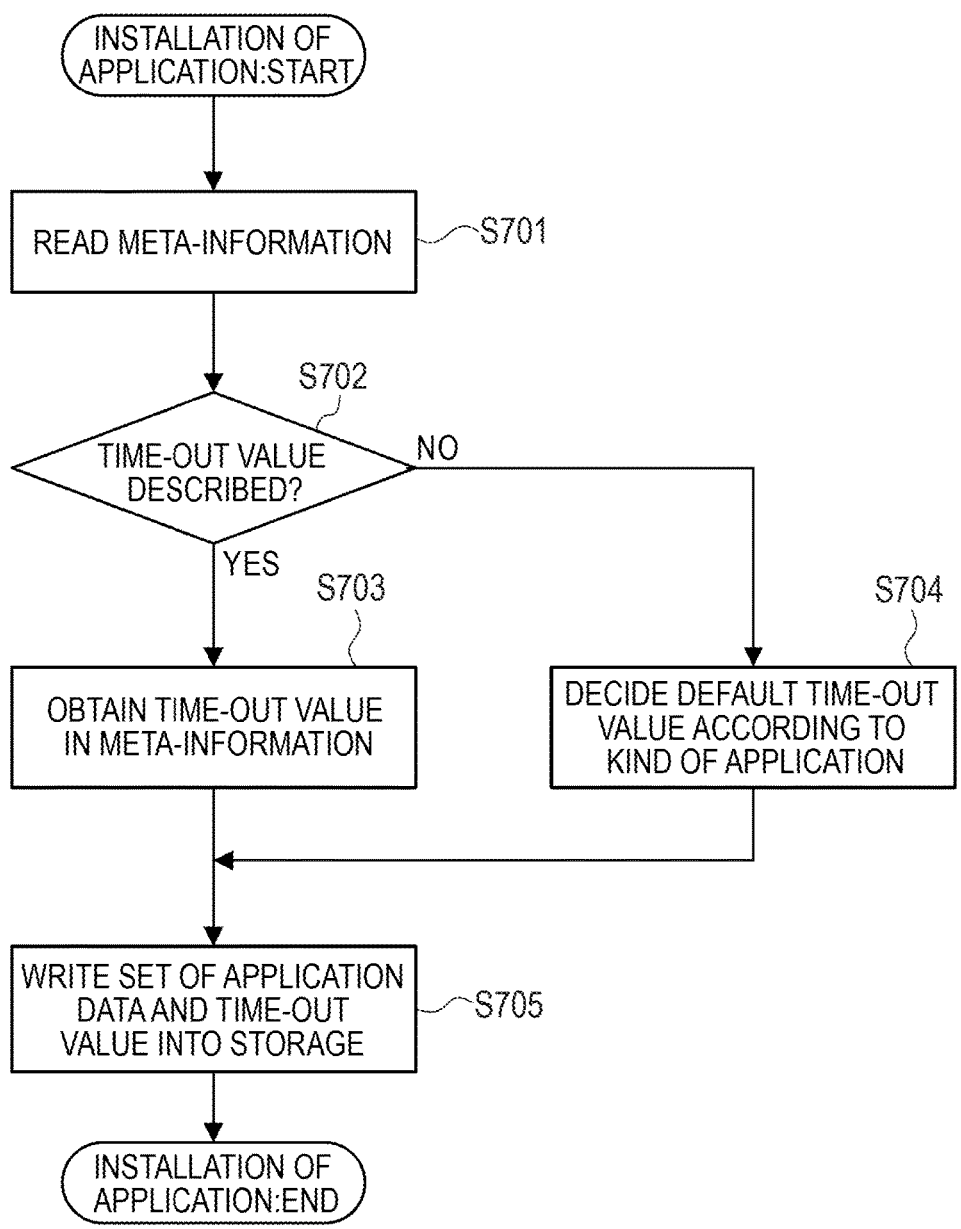
FIG. 7 is a flow chart for describing details of the process in S602.
Figure 8:
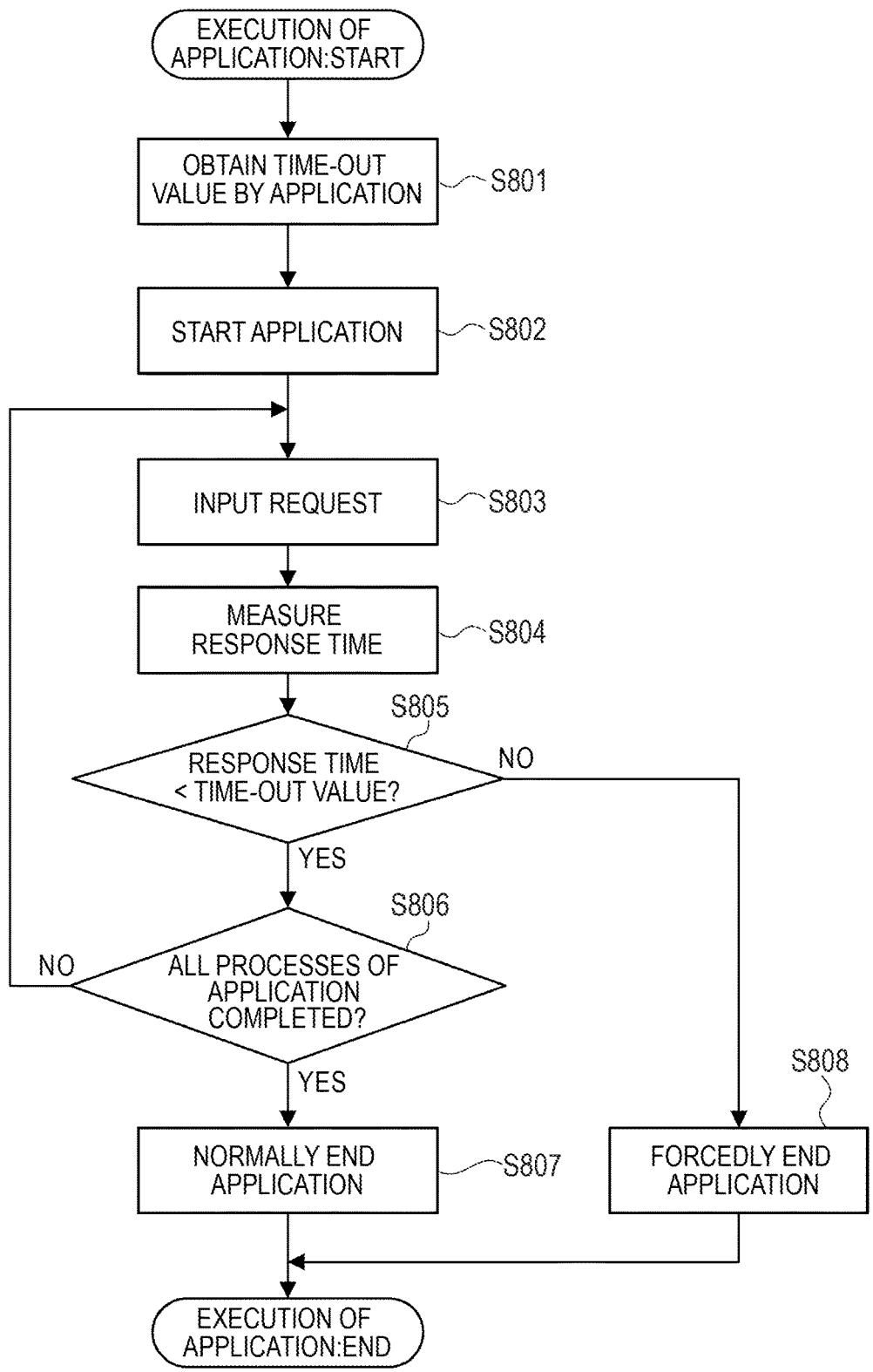
FIG. 8 is a flow chart for describing details of the process in S603.

It should be noted that modules illustrated in later-described FIGS. 2 and 3 and processes of flow charts illustrated in later-described FIGS. 6 to 8 are achieved on condition that the CPU 101 loads the programs such as applications and the like stored in the storage 104 into the RAM 102 and then executes the loaded programs.

Figure 2:
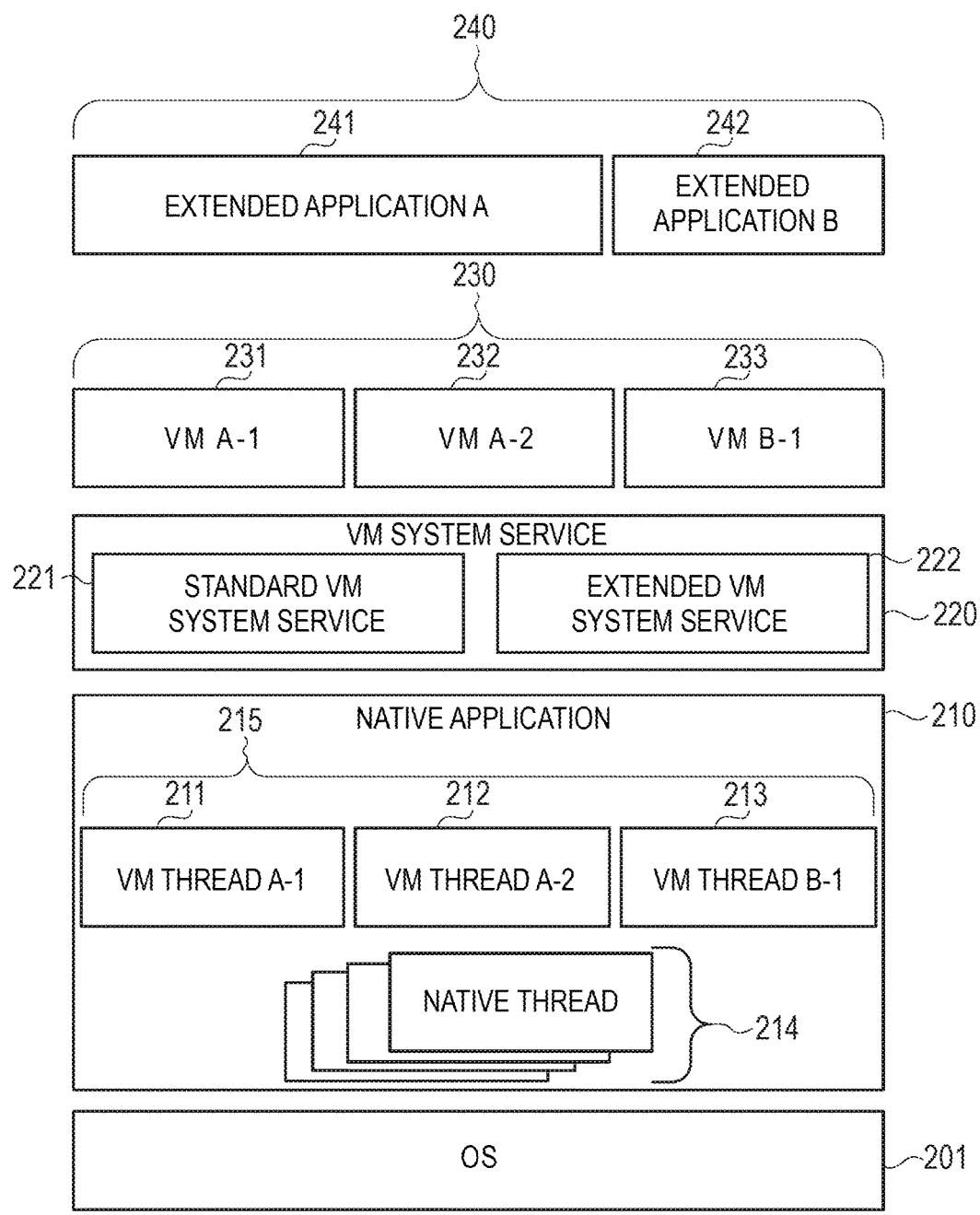
FIG. 2 is a diagram for illustrating an example of a platform environment or the like of the image forming apparatus.

FIG. 2 is a diagram for illustrating an example of a platform environment and the like of the image forming apparatus which executes extended applications. On the OS 201 which serves as an operating system, a native application 210 for controlling the image processing units such as the printer, a facsimile machine and the scanner is operating. Also, on the OS 201, a VM (virtual machine) 230 which serves as an execution environment of the extended application is operating. The VM 230 is a module which understands and executes the application for controlling the extended application. The extended application always operates on the VM 230. In the present embodiment, the VM 230 is a software module, but it may be a hardware module.

In the native application 210, there are a native thread 214 for controlling the image processing units such as the printer, the facsimile machine and the scanner, and a VM thread 215 for moving the VM 230. Incidentally, there are the plurality of VM threads 215 of which the number corresponds to the number of the VMs 230. In the example of FIG. 2, three threads 211, 212 and 213 are generated. The VM thread 215 corresponds to a platform 300 illustrated in later-described FIG. 3.

A VM system service 220 is a utility library which is commonly used from the extended applications. By invoking the function of the VM system service 220 from the extended application 240, it is possible to save a trouble of developing the extended application 240 or to access each module of the image forming apparatus. The VM system service 220 includes a standard VM system service 221 which causes to operate as the VM at least, and an extended VM system service 222 which accesses each module of the image forming apparatus and provides the OS functions.

The VM 230 executes the extended application 240. The VM 230 is generated for each thread of the extended application 240. In the example of FIG. 2, a VM A-1 231 and a VM A-2 232 for moving two threads in an extended application A 241, and a VM B-1 233 for moving one thread in an extended application B 242 are generated. As an example of the extended application, there is a login application or the like which executes user authentication.

An icon for each extended application is displayed on a main menu screen displayed on the operation unit 112 of the image forming apparatus. When the operation unit I/F 106 detects via the operation unit 112 that the user has selected this icon, the operation unit I/F 106 transmits such a fact to the CPU 101. Upon receiving the relevant fact, the CPU 101 executes a process based on the program related to the extended application corresponding to an icon selected by the user, thereby achieving the extended application.

Figure 3:
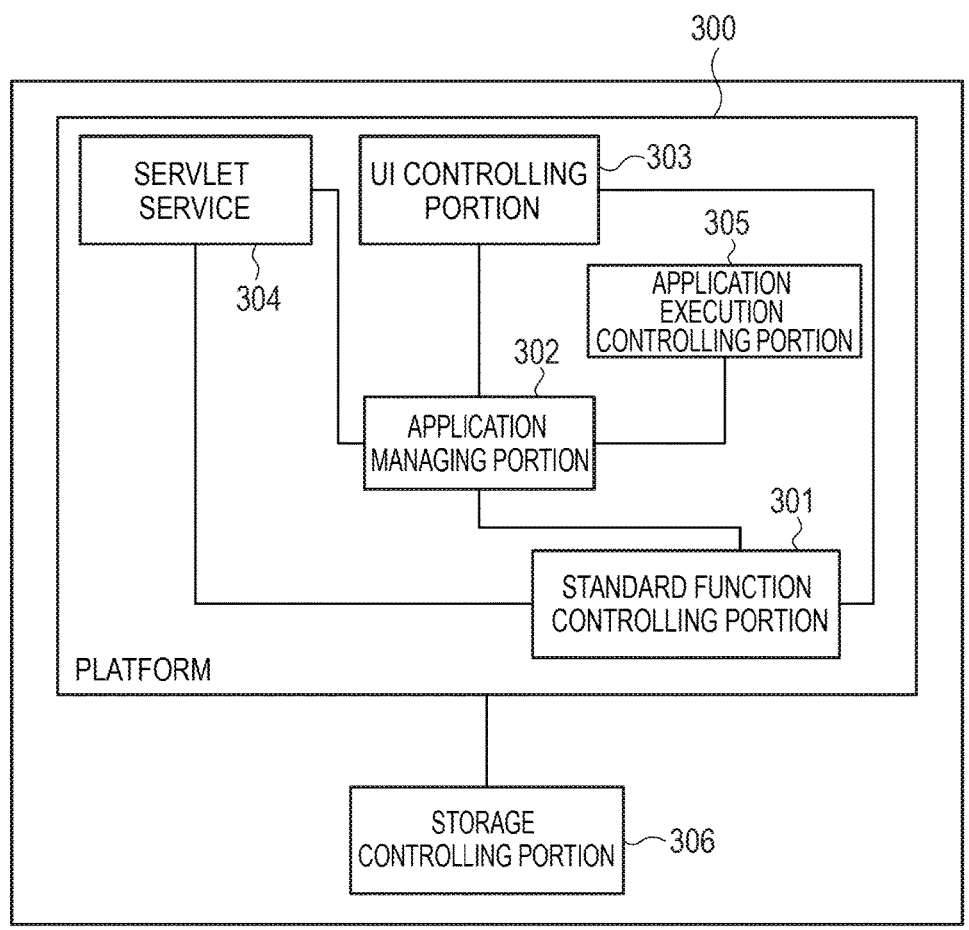
FIG. 3 is a diagram for illustrating an example of a configuration of a platform.

FIG. 3 is a diagram for illustrating an example of the configuration of the platform 300. A servlet service 304 is a module which accepts a request when it is accessed using an HTTP (HyperText Transfer Protocol) via the network I/F 110, and distributes a process to a module (an application managing portion 302 or a standard function controlling portion 301) according to an accessed URL (Uniform Resource Locator). A UI (user interface) controlling portion 303 displays a screen on the operation unit 112, accepts an operation from the user, and notifies such operation information to an appropriate module (the application managing portion 302 or the standard function controlling portion 301). The application managing portion 302 is a module which executes management such as installation, activation and the like of the extended application. An application execution controlling portion 305 is a module which executes execution control of an application activated by the application managing portion 302. More specifically, the application execution controlling portion 305 controls the VM thread 215, the VM system service 220, the VM 230 and the extended application 240. A storage controlling portion 306 is a module which records and manages the setting information of the image forming apparatus. Each of the modules accesses the storage controlling portion 306, and obtains and sets the setting value. The standard function controlling portion 301 is a module which executes control of the copy function and a facsimile function being standard functions of the image forming apparatus, and executes another necessary control (for example, control of the USB host I/F 113) necessary for the image forming apparatus.

FIG. 4 is a diagram for illustrating an example of meta-information of an application. The meta-information is stored in the RAM 102, the storage 104 or the like, for example. In the meta-information, an ID (401) for identifying the application, a name (402) of the application, a version (403) of the application, a kind of the application (404), a time-out value of the application (405) and the like are provided. Not all the items of the meta-information are provided as essential, and it is possible to omit to provide the time-out value or the like. Applications are classified according to their uses. More specifically, kinds are specified such as "Login" for an application of executing login control, "screenSaver" for a screen saver application, and "generic" for a general-purpose application. In the example of FIG. 4, the application named "appName" is of the kind "Login", and the time-out value is specified as 10000 milliseconds.

Figure 5:
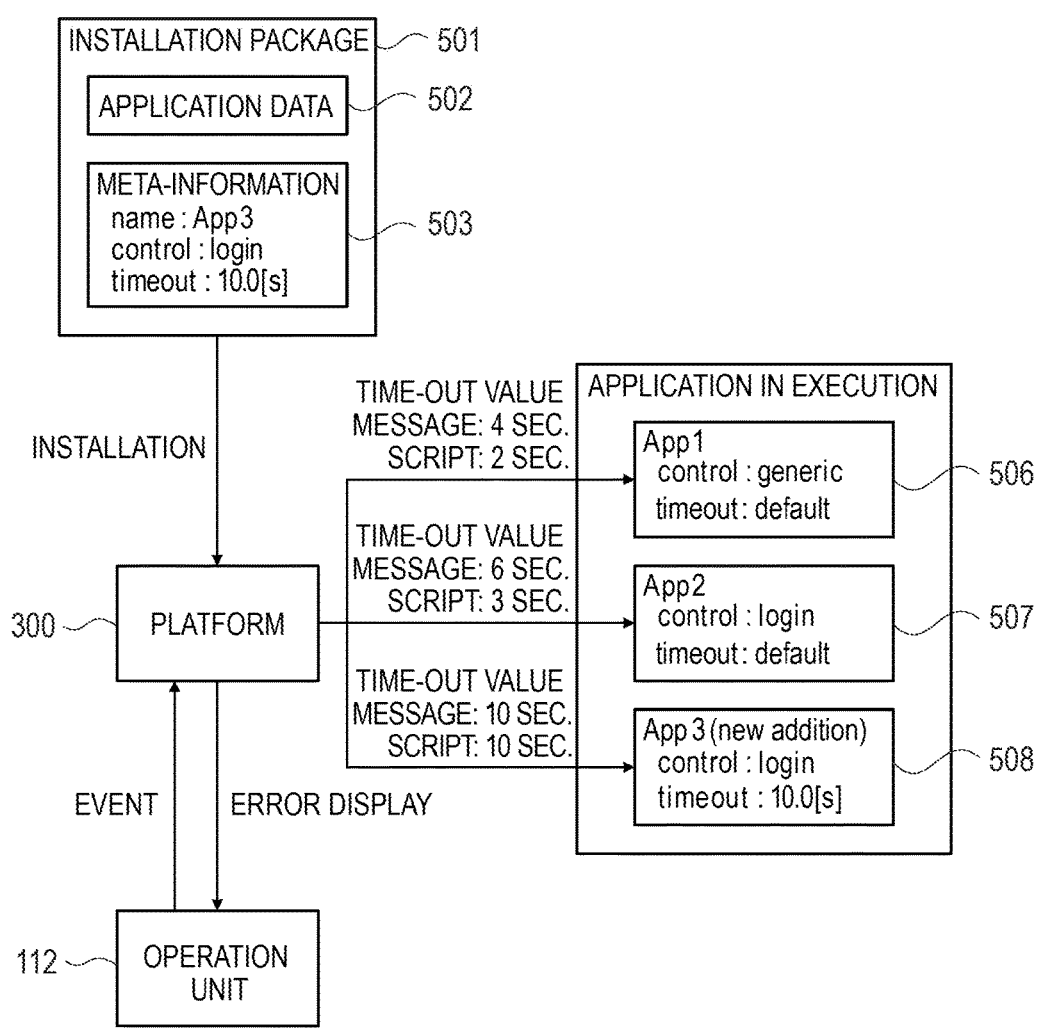
FIG. 5 is a diagram for illustrating an example of the platform.

FIG. 5 is a diagram for illustrating an example of a platform relating to installation and execution of an application. When installing the application, the CPU 101 obtains an installation package 501 which includes data (application data) 502 of the body of the application and meta-information 503, via the network IF 110 or the USB host I/F 113. The application managing portion 302 in the platform 300 installs the application based on the installation package 501, and also reads the contents of the meta-information 503. The application execution controlling portion 305 can obtain the contents of the read meta-information, and changes the controlling method of the application according to the specification of the meta-information.

The change of the controlling method related to the time-out value will be described with reference to FIG. 5. In the example of FIG. 5, three applications 506, 507 and 508 are operating, and the specifications of the application kinds and the time-out values are different from others. The application 508 is an application which is installed by the installation package 501, and the specification thereof is based on the meta-information 503. The platform 300 receives an event from the operation unit 112, and inputs a request to an appropriate application. Depending on the kind of request to be input, the platform 300 switches between two kinds of inputting methods, message transmission and script execution, so that different time-out values can be used for each application even for the same application. For example, since the time-out value is not specified, the application 506 uses default time-out values of 4 seconds for the message transmission and 2 seconds for the script execution. Similarly, no time-out value is specified for the application 507. However, since the application kind is different from the application 506, the application 507 uses default time-out values prepared for the "Login" application of 6 seconds for the message transmission and 3 seconds for the script execution. The application kind of the application 508 is the same as that of the application 507, but this time the time-out value is specified as 10 seconds. Therefore, the application 508 uses a time-out value of 10 seconds for both the message transmission and the script execution. In this way, the platform 300 changes the time-out value according to the meta-information of each application. When there is no response from the application even though it exceeds the specified time-out value, the platform 300 determines that an abnormality occurs in the application, and displays an error message on the operation unit 112. The application 508 is an example of a login application of executing user authentication.

FIG. 6 is a flow chart for describing an example of an information process from the installation to the execution of the application. In S601, an external apparatus 903 illustrated in later-described FIG. 9 recognizes the input of the meta-information from a keyboard at the time of the application development, and describes the meta-information in the installation package of the application. The time-out value is included in the meta-information, and it is assumed that values studied in advance are described in consideration of a process to be executed in the application by the developer of the application. If it is unnecessary to specify a time-out value, then it is possible to omit describing the time-out value. In S602, the platform 300 installs the application by using the installation package including the meta-information. Details of the process of S602 will be described with reference to later-described FIG. 7. In S603, the platform 300 changes the control at the time of application execution according to the meta-information. Details of the process of S603 will be described with reference to later-described FIG. 8.

FIG. 7 is a flow chart for describing the details of the process of S602. In S701, the application managing portion 302 reads the meta-information in the installation package. In S702, the application managing portion 302 determines whether or not a time-out value is described in the meta-information. When the application managing portion 302 determines that the time-out value is described in the meta-information (YES in S702), the process advances to S703. On the other hand, when it is determined that the time-out value is not described in the meta-information (NO in S702), the process advances to S704. In S703, the application managing portion 302 obtains the time-out value from the meta-information. On the other hand, in S704, the application managing portion 302 determines the time-out value based on the default time-out value corresponding to the kind of application related to the installation. In S705, the application managing portion 302 completes the installation by describing the application data in the installation package and the time-out value in association with each other in the storage 104.

FIG. 8 is a flow chart for describing the details of the process of S603. In S801, the application execution controlling portion 305 obtains the time-out value described in association with the execution-target application from the storage 104. In S802, the application execution controlling portion 305 starts executing the execution-target application. In S803, the application execution controlling portion 305 inputs a request to the application. In S804, the application execution controlling portion 305 measures time until a response is returned from the application. In S805, the application execution controlling portion 305 determines whether or not the response time is less than the time-out value obtained in S801. When the application execution controlling portion 305 determines that the response time is less than the time-out value obtained in S801 (YES in S805), the process advances to S806. On the other hand, when the application execution controlling portion 305 determines that the response time is equal to or greater than the time-out value obtained in S801 (NO in S805), the process advances to S808. In S806, the application execution controlling portion 305 determines whether or not all the processes to be executed by the execution-target application have been completed. When the application execution controlling portion 305 determines that all the processes to be executed by the execution-target application have been completed (YES in S806), the process advances to S807. On the other hand, when the application execution controlling portion 305 determines that all the processes to be executed by the execution-target application have not been completed (NO in S806), the application execution controlling portion returns the process to S803. Then, the application execution controlling portion 305 repeats the processes of S803 to S806 until all the processes to be executed by the execution-target application are completed. In S807, the application managing portion 302 normally ends the application. On the other hand, in S808, the application managing portion 302 determines that an abnormality occurs in the application, and forcibly ends the application.

Figure 9:
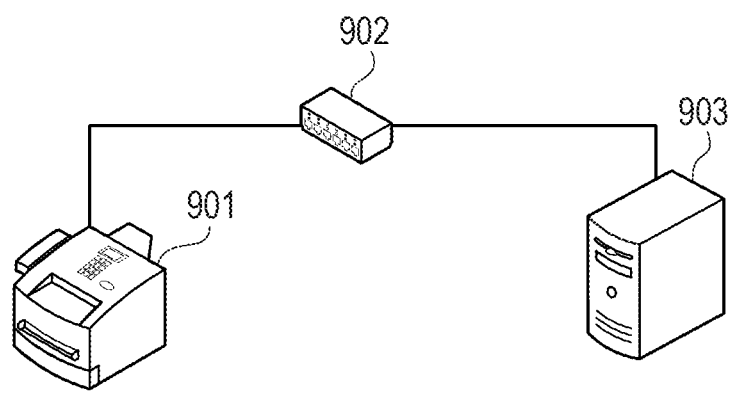
FIG. 9 is a diagram for illustrating an example of a system configuration of a printing system including the image forming apparatus.

FIG. 9 is a diagram for illustrating an example of a system configuration of a printing system which includes the image forming apparatus. The printing system includes an image forming apparatus 901, a network router 902 and the external apparatus 903. The external apparatus 903 installs the extended application via the installer to the image forming apparatus 901 connected via the network. Besides, the external apparatus is connected to the image forming apparatus 901 with a browser, and changes the setting of the extended application. The network router 902 mediates the communication to be executed between the image forming apparatus 901 and the external apparatus 903. In response to an installation request from the external apparatus 903, the image forming apparatus 901 executes an installing process of the extended application, and returns an HTTP response to an HTTP request.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although the examples of the embodiment of the present invention have been described in detail as above, the present invention is not limited to the relevant embodiment. In the above embodiment, the default time-out value is switched depending on the kind of application, but the present invention is not limited to this. For example, the platform 300 may determine the default time-out value based on either the size of the application or an API (Application Programming Interface) to be used, or based on both the size and the API. Besides, in the above embodiment, the platform 300 uses the same time-out value for all kinds of requests when the time-out value is specified based on the meta-information. However, the time-out value for each request may be specified based on the meta-information. Besides, based on the time-out value of the meta-information included in the request, the platform 300 describes the time-out value to the storage for each application data related to the request.

According to the process of the above embodiment, by specifying an appropriate time-out value suitable for each application at the time of addition of the application, it is possible to reduce the possibility of erroneous abnormality detection. Since it is unnecessary to dynamically change the time-out value, it is possible to derive the above effect from the time of initial activation of the application.

Besides, since the individual time-out value can be specified for each application, even if an application including a time-consuming process is added, it does not affect the time-out process of the existing application. That is, even if an application with a long time-out value is added, it is possible to continue to use a short time-out value for the application which does not include the time-consuming process. Thus, it is possible to execute the time-out process without degrading performance.

According to the embodiments of the present invention, it is possible to reduce the possibility of erroneous time-out detection.

The embodiment of the present invention solves the conventional problem that an appropriate time-out value cannot be set until a sufficient amount of statistical information is obtained after addition of a new application because the time-out value is determined based on the statistical information. Besides, the embodiment of the present invention solves the conventional problem that, when managing a plurality of applications with different time required for process, since a timeout value is set to be longer in accordance with the application taking longer time to process, also time necessary for determination of occurrence of abnormality in another application taking less time to process is prolonged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-099701, filed May 19, 2017, which is hereby incorporated by reference herein in its entirety.

What is claimed is:

1. An image forming apparatus comprising:
    a memory configured to store an application, a platform which is a program environment for executing the application, and instructions; and
    a processor configured to execute the instructions to perform:
        a setting task that sets a time-out value related to execution time of the application operating on the platform stored in the memory, the time-out value defining a time threshold for determining occurrence of an error condition regarding the application in the image forming apparatus; and
        a control task that controls execution of the application based on the time-out value, set by the setting task, related to the execution time of the application,
        wherein the setting task sets the time-out value by:
            determining whether the time-out value is provided in meta-information associated with the application;
            in a case where the time-out value is provided in the meta-information, setting the time-out value provided in the meta-information as the time-out value related to execution time of the application; and
            in a case where the time-out value is not provided in the meta-information, setting a time-out value, to be set when the time-out value is not provided in the meta information, associated with a type of the application stored in the memory as the time-out value related to execution time of the application, and
        wherein the control task controls execution of the application by:
            measuring a response time to an execution request for the application;
            detecting that the error condition has occurred when the measured response time is greater than the set time-out value for the application; and
            terminating the application when the error condition is detected.

2. The image forming apparatus according to claim 1, wherein the setting task sets the time-out value provided in the meta-information of the application included in an installation package of the application, as the time-out value of the application.

3. The image forming apparatus according to claim 1, wherein the time-out value for each application is provided in the meta-information.

4. The image forming apparatus according to claim 1, wherein, in the case where the time-out value is not provided in the meta-information, the setting task sets the time-out value, to be set when the time-out value is not provided in the meta information, which is different depending on the type of the application, as the time-out value of the application.

5. The image forming apparatus according to claim 1, wherein, in the case where the time-out value is not provided in the meta-information, the setting task sets the time-out value, to be set when the time-out value is not provided in the meta information, which is different depending on a size of the application, as the time-out value of the application.

6. The image forming apparatus according to claim 1, wherein, in the case where the time-out value is not provided in the meta-information, the setting task sets the time-out value, to be set when the time-out value is not provided in the meta information, which is different depending on an API (Application Programming Interface) used by the application, as the time-out value of the application.

7. The image forming apparatus according to claim 1, wherein the application is a login application for executing user authentication.

8. The image forming apparatus according to claim 1, wherein the type of the application includes at least one of a type of application controlling a log-in process, a type of application executing a screen saver, and a type of a generic application.

9. A method of controlling an image forming apparatus, which includes a memory configured to store an application and a platform that is a program environment for executing the application, the controlling method comprising:
   setting a time-out value related to execution time of the application operating on the platform stored in the memory, the time-out value defining a time threshold for determining occurrence of an error condition regarding the application in the image forming apparatus; and
   controlling, by the platform, execution of the application based on the set time-out value related to the execution time of the application
   wherein the time-out value is set by:
      determining whether the time-out value is provided in meta-information associated with the application;
      in a case where the time-out value is provided in the meta-information, setting the time-out value provided in the meta-information as the time-out value related to execution time of the application; and
      in a case where the time-out value is not provided in the meta-information, setting a time-out value, to be set when the time-out value is not provided in the meta information, associated with a type of the application stored in the memory as the time-out value related to execution time of the application, and
   wherein the execution of the application is controlled by:
      measuring a response time to an execution request for the application;
      detecting that the error condition has occurred when the measured response time is greater than the set time-out value for the application; and
      terminating the application when the error condition is detected.

10. A non-transitory computer-readable storage medium which stores instructions for causing a processor to execute a method of controlling an image forming apparatus, which includes a memory configured to store an application and a platform that is a program environment for executing the application, the controlling method comprising:
   setting a time-out value related to execution time of the application operating on the platform stored in the memory, the time-out value defining a time threshold for determining occurrence of an error condition regarding the application in the image forming apparatus; and
   controlling, by the platform, execution of the application based on the set time-out value related to the execution time of the application
   wherein the time-out value is set by:
   determining whether the time-out value is provided in meta-information associated with the application;
      in a case where the time-out value is provided in the meta-information, setting the time-out value provided in the meta-information as the time-out value related to execution time of the application; and
      in a case where the time-out value is not provided in the meta-information, setting a time-out value, to be set when the time-out value is not provided in the meta information, associated with a type of the application stored in the memory as the time-out value related to execution time of the application, and
   wherein the execution of the application is controlled by:
      measuring a response time to an execution request for the application;
      detecting that the error condition has occurred when the measured response time is greater than the set time-out value for the application; and
      terminating the application when the error condition is detected.

* * * * *